(12) United States Patent
Chung

(10) Patent No.: US 8,360,366 B1
(45) Date of Patent: Jan. 29, 2013

(54) DIAMOND CONSTELLATION OF NON-GEOSTATIONARY SATELLITES FOR BROADBAND MULTIMEDIA COMMUNICATIONS

(76) Inventor: Hsin-Hsien Chung, San Diego, CA (US)

(*) Notice: Subject to any disclaimer, the term of this patent is extended or adjusted under 35 U.S.C. 154(b) by 168 days.

(21) Appl. No.: 12/661,223

(22) Filed: Mar. 12, 2010

Related U.S. Application Data

(60) Provisional application No. 61/210,050, filed on Mar. 12, 2009.

(51) Int. Cl.
*B64G 1/10* (2006.01)
(52) U.S. Cl. .................................................. 244/158.4
(58) Field of Classification Search ............... 244/158.4, 244/158.5, 158.1; 701/13, 226; 455/12.1, 455/427
See application file for complete search history.

(56) References Cited

U.S. PATENT DOCUMENTS

| 2001/0041950 A1* | 11/2001 | Cellier | 701/13 |
| 2001/0045494 A1* | 11/2001 | Higgins | 244/158 R |
| 2007/0284482 A1* | 12/2007 | Furman | 244/158.4 |

* cited by examiner

*Primary Examiner* — Michael Carone
*Assistant Examiner* — Nicholas McFall

(57) ABSTRACT

The present invention is related to a method in the design of constellation of non-geostationary satellites for broadband multimedia communications. A broadband multimedia satellite communication system based on the present invention will not have interference problems with the GEO satellites and terrestrial communications. Users of the system will be able to use very low cost simple automatic tracking antenna to access broadband multimedia services anywhere around the world.

4 Claims, 1 Drawing Sheet

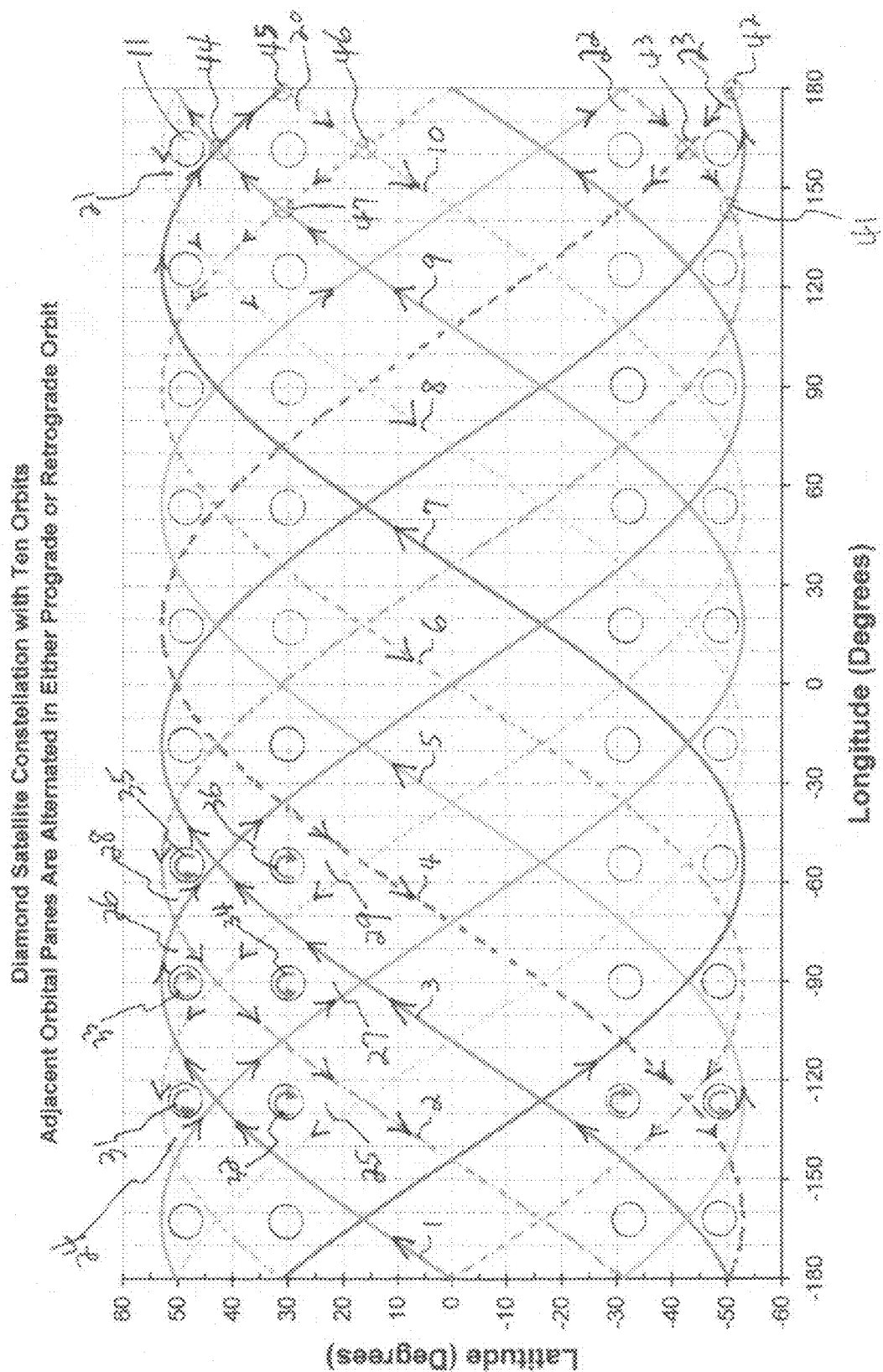

DIAMOND CONSTELLATION OF NON-GEOSTATIONARY SATELLITES FOR BROADBAND MULTIMEDIA COMMUNICATIONS

CROSS-REFERENCE TO RELATED APPLICATIONS

This patent application is related to U.S. provisional patent application having Application No. 61/210,050 filed on Mar. 12, 2009.

FIELD OF INVENTION

The present invention is related to a method in the design of constellation of non-geostationary satellites for broadband multimedia communications. The present invention is also related to a communication system utilized non-geostationary satellites of the constellation presented here that user will be able to use simple automatic tracking antenna to access broadband multimedia services and there will have no interference problems with the GEO satellites and terrestrial communications.

BACKGROUND OF THE INVENTION

Non-Geostationary satellites ("NGS") for applications of broadband multimedia satellite communications ("BMSC") are being addressed more often in recent years. Due to the nature of NGS that is not stationary with respect to the earth, many satellites in orbits are always required to provide continuous services for global coverage. Hence, the satellite constellation design is one of critical technology to insure the success of BMSC via NGS ("BMSC-NGS"). Highly elliptical orbit, such as Molniya proposed by Russian, is good for a relative smaller region of coverage. Moderate elliptical orbit is more suitable to half hemispherical coverage. Near circular orbit is ideal for global scale coverage such as Iridium, Globalstar, Odyssey, Skybridge, Teledesic, etc.

The polar orbit satellite constellation of Iridium system of Motorola is based on the design concept presented by W. S. Adams and L. Rider that all of six orbital planes are inclined at the same inclination angle of 86.4 degrees. Each orbital plane consists of eleven satellites. Polar orbit constellation has a great concentration of satellites near the poles of earth where there are not many people lived there. The Globalstar system of Loral, satellite programs of the Skybridge of Alcatel and Odyssey of TRW used inclined orbit satellite constellations that had been studied extensively by J. G. Walker. The orbital planes of satellite constellation design in these systems are all inclined at the same prograde orbits (inclination angle between 0 and 90 degrees) with the inclination angle closed to 52 degrees. The constellation design of these three systems tends to provide more uniform distribution globally than of the polar orbit. The orbital planes of satellite constellation design in the Teledesic system are all inclined at the same retrograde orbits (inclination angle greater than 90 degrees) with the inclination angle closed to 98.2 degree.

It is noted from previous arts and earlier constellations designs that there are common deficiencies and issues did not addressed. None of the previous arts have addressed the important topic that how to simplify satellite tracking problems of the user's antenna via satellite constellation design. In order to achieve continuous services of a quality communication, the user's antenna must be able to track each NGS being linked and the next coming NGS to be connected simultaneously during the transition period of these two satellites discussed above. The satellite communication system s based on previous arts of the constellation design will require two separate antennas or two separate antenna beams so that they are able to track these two satellites, being linked and to be linked next, correspondingly and simultaneously over a very wide field of view across the sky. Hence, it is difficult to realize low cost user's antenna systems for BMSC-NGS applications based on previous arts of satellite constellation design.

The other important topics did not address from the previous arts of the satellite constellation design are that how to eliminate the potential interference issues with GEO satellite and terrestrial communication for the applications of BMSC-NGS. The minimum elevation angle of a user's antenna pointing toward the satellite is typical at 10 degrees or less for the NGS system based on previous arts. As user's antenna pointing at low elevation angle, the potential interference with terrestrial communication and the blockage problems from the surrounding structures of user's antenna are becoming serious issues for the BMSC-NGS applications. The potential interference with GEO satellites will also limit the BMSC-NGS applications for users near the equatorial regions (e.g. between latitude 10S and 10N degrees).

The effective way to eliminate the interference with the GEO satellites is to point user's antenna away from the GEO satellites. User's antenna always pointing at high elevation angle is the only way to eliminate the potential interference issue with terrestrial communications and minimize the blockage problems from the surrounding structures of user's antenna. The best way to achieve a simple tracking of the NGS of user's antenna is to enable user's antenna to track satellites in continuous link loops.

The objective of the present invention is to solve these deficiencies of previous arts mentioned above so that NGS could be used widely for broadband multimedia communications in the future. The constellation design based on the present invention will simplify the satellite tracking problems of user's antenna and completely eliminate the interference problems with GEO satellites and terrestrial communication services. The blockages from the surrounding structures of user's antenna will also be minimized because user's antenna is able to point at high elevation angle for the satellite constellation system based on the present invention.

SUMMARY OF THE INVENTION

The present invention is directed to a method in the design of a diamond satellite constellation ("DSC") of non-geostationary satellites that consists of pre-determined number of satellites arranged in various pre-determined number of orbital planes, and every adjacent orbital planes of the DSC are alternated in either prograde orbit with the inclination angle of orbit between 0 and 90 degrees or retrograde orbit with the inclination angle of orbit greater than 90 degrees. The flight path of the satellites in the orbital planes discussed above will form continuous tracking loops like a spherical space net covering the earth at the selected orbital height so that there are always communication link loops ("CLL") available for user's antenna located at anywhere. Either three or four orbital planes of satellites will form a diamond shape of CLL ("Diamond Cell") that each side of Diamond Cell is corresponding to a specific orbital plane of the DSC. Communication handover ("CH") for each of the Diamond Cell occurs at the specified crossover point between the satellite flying in one orbital plane being linked and the next coming satellite flying in the other orbital plane to be linked. The orbital planes of the DSC have slightly different orbital height to facilitate the CH at the crossover points. There are either three or four handover points for each of the Diamond Cell.

Each orbital plane has a pre-determined number of satellites. In order to provide continuous services of a quality communication, the minimum number of satellites required for each orbital plane of the DSC is the integer of the number of orbital planes divided by two. Preferably, every orbital plane of the DSC has equal number of satellites. The satellites travelled in each of the orbital planes of the DSC are equally spaced.

The present invention is also directed to a satellite communication system via the DSC of NGS ("DSC-NGS") that will be able to use low cost user's antenna equipped with a relatively simple tracking mechanism for BMSC-NGS applications. User's antenna will track satellites of the specified Diamond Cell discussed above in either a clock-wise ("CW") or counter-clock-wise ("CCW") direction and will track every adjacent Diamond Cell in the opposite direction. User's antenna could track the satellite being linked in one Diamond Cell and the next coming satellite to be linked in the adjacent Diamond Cell continuously and seamlessly so that the satellite tracking path of user's antenna just like writing an Arabic number eight ('8') horizontally during the rotation of the earth itself. The system described above will simplify the satellite tracking mechanism of user's antenna so that a very low cost automatic tracking user's antenna could be developed for the BMSC-NGS applications.

The present invention is further directed to a method in the design of the DSC-NGS that will be able to eliminate interference issue with GEO satellites completely. The Diamond Cell could be formed in the desired regions through the proper adjustment of the inclination angle of the orbital planes of the DSC. There are no Diamond Cells in the equator region that is between the latitude 10S and 10N. The Diamond Cells formed are further away from the equator region. Users of BMSC-NGS services near the equator region are able to point their antennas away from the GEO satellites to access the other Diamond Cells discussed above. Hence, there will have no interference issues with the GEO satellites for user's antennas. In order to provide continuous services of a quality global communication, the minimum number of Diamond Cell is the number of orbital planes of the DSC-NGS multiplied by the minimum number of satellites required at each of the orbital planes.

The present invention is finally directed to a method in the design of DSC-NGS that will be able to eliminate the interference with terrestrial communications and minimize the blockage problems from the surrounding structures. User's antenna will be able to track satellites at high elevation angle in most populated regions through the proper adjustment of the inclination angle and number of the orbital planes of the DSC. The blockages from the surrounding structures of user's antenna are thus minimized. The present invention could be applied to any orbital shape (e.g. elliptical or near circular) and any orbital height dependent upon the requirements of applications.

BRIEF DESCRIPTION OF THE DRAWINGS

FIG. 1 shows a diamond satellite constellation of non-geostationary satellites with ten orbits.

DETAILED DESCRIPTION OF THE INVENTION

The present invention is directed to a method in the design of a diamond satellite constellation ("DSC") of non-geostationary satellites that consists of pre-determined number of satellites arranged in various pre-determined number of orbital planes, and every adjacent orbital plane of the DSC are alternated in either prograde orbit or retrograde orbit. The definition of prograde orbit is that the inclination angle of the orbit of satellites is between 0 and 90 degrees. The definition of retrograde orbit is that the inclination angle of the orbit of satellites is greater than 90 degrees. As shown FIG. 1, there are ten orbital planes that each of the orbits is equally separated by 36 degrees in longitude. Note that the number of orbits shown in the FIG. 1 is just to serve the purpose of illustration of the DSC concept only. The arrow shown is to indicate the flying path direction of satellites in each of the ten orbits. The orbit 1 in blue solid line is in prograde orbit and the adjacent orbit 2 in red dashed line is in retrograde orbit. The next adjacent orbit of the orbit 2 is the orbit 3 in lighter blue solid line that is in prograde orbit again. It is easily understood from the FIG. 1 that the orbit in even number will be in retrograde orbits and the orbit in odd number will be in prograde orbit.

The flight path (or orbit) of the satellites in the orbital planes discussed above will form a spherical space net covering the earth at the selected orbital height so that there are always communication link loops ("CLL") available for user's antenna located at anywhere. Either three or four orbital planes of satellites will form a diamond shape of CLL ("Diamond Cell") as shown in FIG. 1. The CLL are in black circles as indicated in FIG. 1. There are total of forty (40) Diamond Cells having the black circle of CLL like the CLL 11 indicated in the FIG. 1. The arrow marks at each side of the Diamond Cells such as cell 20 are used to indicate the flying path direction of satellites in their respected orbits. Each side of Diamond Cell is corresponding to a specific orbital plane of the DSC. The Diamond Cell 22 is forming by the orbit 1, 5, 2 and 4. The Diamond Cell 23 is forming by the orbit 2, 3 and 4.

Communication handover ("CH") for each of the Diamond Cells occurs at the specified crossover points between the satellite flying in one orbital plane being linked and the next coming satellite flying in the other orbital plane to be linked. The orbital planes of the DSC have slightly different orbital height to facilitate the CH at the crossover points. As shown in FIG. 1, there are either three or four handover points indicated in red small circles occurred for each of the Diamond Cells. The handover points 41, 42 and 43 are occurred at the Diamond Cell 23 and the handover points 44, 45, 46 and 47 are occurred at the Diamond Cell 20. The CH at the handover point 41 of the Diamond Cell 23 occurs at the crossover point between the satellite flying in the orbit 3 and the next coming satellite flying in the orbit 2 and vice versa. The CH at the handover point 46 of the Diamond Cell 20 occurs at the crossover point between the satellite flying in the orbit 6 and the next coming satellite flying in the orbit 10 and vice versa.

Each orbital plane of satellite constellation has a pre-determined number of satellites. In order to provide continuous services of a quality global communication, the minimum number of satellites required for each orbital plane of the DSC is the integer of the number of orbital planes divided by two. Preferably, every orbital plane of the DSC has equal number of satellites. The satellites travelled in each of the orbital planes of the DSC are equally spaced.

The present invention is also directed to a satellite communication system via the DSC of NGS ("DSC-NGS") that will be able to use low cost user's antenna equipped with a relative simple tracking mechanism for BMSC-NGS applications. User's antenna terminal will track satellites of the specified Diamond Cell discussed above in either clock-wise ("CW") or counter-clock-wise ("CCW") direction and will track every adjacent Diamond Cell in the opposite direction. For example, the satellite tracking direction of user's antenna is in red half circle with arrow marked to indicate either CW direction such as 32, 34, and 36 or CCW direction such as 31, 33 and 35. User's antenna tracking satellites in the Diamond Cell 27 is in CCW direction. User's antenna tracking satellites in the adjacent Diamond Cells of 27 such as the Diamond Cell 25, 26 and 29 are all in CW direction. User's antenna could track the satellites being linked in the Diamond Cell 25 and the next coming satellites to be linked in the Diamond Cell 27 continuously and seamlessly so that the satellite tracking path of user's antenna just like writing an Arabic number eight ('8') horizontally during the rotation of the earth itself. The system described above will simplify the satellite tracking mechanism of user's antenna so that a very low cost automatic tracking user's antenna could be developed for the BMSC-NGS applications.

The present invention is further directed to a method in the design of the DSC-NGS that will be able to eliminate interference issue with GEO satellites completely. The Diamond Cells could be formed in the desired regions such as between the latitude 15S and the latitude 55S and between the latitude 15N and the latitude 55N through the proper adjustment of the inclination angle of the orbital planes of the DSC for a selected orbital height. There are no Diamond Cells in the equator region that is between the latitude 10S and 10N. The Diamond Cells formed are further away from the equator region. Users of BMSC-NGS services near the equator region are able to point their antennas away from the GEO satellites to access the other Diamond Cells between the latitude 15S and the latitude 40S and also between the latitude 15N and the latitude 40N. Hence, there will have no interference issues with the GEO satellites for user's antennas. In order to provide continuous services of a quality global communication, the minimum number of Diamond Cell is the number of orbital planes of the DSC-NGS multiplied by the minimum number of satellites required at each of the orbital planes.

The present invention is finally directed to a method in the design of DSC-NGS that will be able to eliminate the interference with terrestrial communications and minimize the blockage problems from the surrounding structures. User's antenna will be able to track satellites at high elevation angle in most populated regions between the latitude 20N and the latitude 50N through the proper adjustment of the inclination angle and the number of the orbital planes of the DSC. The blockages from the surrounding structures of user's antenna are thus minimized. The present invention could be applied to any orbital shape (e.g. elliptical or near circular) and any orbital height dependent upon the requirements of applications.

While this invention has been described in reference to illustrative embodiments, it will be understood that foregoing descriptions is not intended to be construed in a limiting sense. Various modifications and combinations of the illustrative embodiments, as well as other embodiments of the invention, will be apparent to persons skilled in the art upon reference to the description. It is therefore intended that the appended claims encompass any of such modifications or embodiments.

The invention claimed is:

1. A method for designing a constellation of non-geostationary satellites, comprising the following steps:
    arranging a pre-determined number of satellites in each of a pre-determined number of orbital planes that every adjacent orbital plane of the constellation are alternated in either prograde orbital plane with the inclination angle of orbit between 0 and 90 degrees with respect to the equator of the earth or retrograde orbital plane with the inclination angle of orbit greater than 90 degrees with respect to the equator of the earth;
    forming a plurality of a first type of closed cell with three separate of said orbital planes and each of the plurality of said first type of closed cell having only three crossover locations;
    forming a plurality of a second type of closed cell by four separate of said orbital planes and each the plurality of the second type closed cell having only four crossover locations;
    arranging handoffs of satellites being tracked and linked by earth antennas proximate said crossover locations;
    forming a plurality of a third type of closed cell by distributing satellites in said orbital planes in such a way that allows said earth antennas to be able to continuously track and link satellites in said orbital planes within each of said third type of closed cell in either clock-wise (CW) direction or counter-clock-wise (CCW) direction and also to track satellites within every adjacent said of said third type of closed cell in the opposite direction, allowing earth antennas to track satellites flying in said plurality of third type of closed cell in either CW or CCW direction; and
    distributing satellites in said orbital planes in such a way that having at least one satellite available within each of said plurality of a third type of closed cell at any time.

2. The method for designing the constellation of non-geostationary satellites according to claim 1, further comprising the step of arranging the said orbital planes of the said constellation of non-geostationary satellites in either elliptical or near circular orbit at specified orbital height dependent upon the requirements of applications.

3. The method for designing the constellation of non-geostationary satellites according to claim 1, further comprising the step of arranging said orbital planes of the constellation of non-geostationary satellites to have slightly different orbital heights and be evenly distributed over 360 degrees.

4. The method for designing the constellation of non-geostationary satellites according to claim 1, further comprising the step of having the minimum number of satellites required for each of the orbital planes of the constellation of non-geostationary satellites to be equal to the integer of the number of the orbital planes of the constellation of non-geostationary satellites divided by two.

* * * * *